INVENTORS
CARL GUNNAR SVALA
ENN ÄRO
GÖRAN LENNART KJELLBERG
BY Hane and Nydick
ATTORNEYS INVENTORS
CARL GUNNAR SVALA
ENN ÄRO
GÖRAN LENNART KJELLBERG
BY Hane and Nydick
ATTORNEYS

United States Patent Office 3,100,820

Patented Aug. 13, 1963

3,100,820

LOW-PASS FILTER FOR PULSE AMPLITUDE MODULATED SIGNAL TRANSMISSION SYSTEMS

Carl Gunnar Svala and Enn Äro, Alvsjo, and Göran Lennart Kjellberg, Johanneshov, Sweden, assignors to Telefonaktiebolaget L M Ericsson, Stockholm, Sweden, a corporation of Sweden Filed June 15, 1959, Ser. No. 820,383
Claims priority, application Sweden June 18, 1958
2 Claims. (Cl. 179—15)

Figure 1:
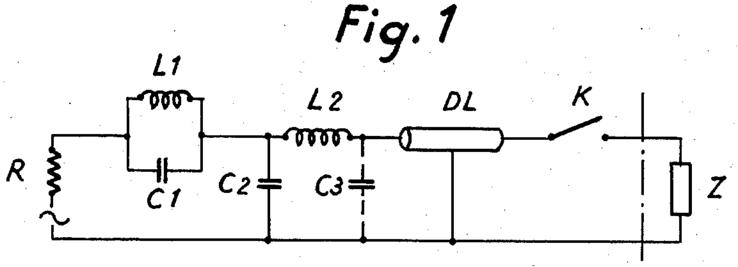

The present invention relates to a low-pass filter arranged for pulse amplitude modulated signal transmission systems.

In electronic telephone systems time divided multiplex transmission between the subscribers is often used to be able to use the speech paths for several simultaneous communications. Such an electronic telephone system as described for example in Ericsson Review No. 1/1956, page 10, periodically issued by the assignee herein for distribution in English speaking countries, or in British Patent 737,417 consists in its most simple form of a number of subscriber's stations or other lines which are connected to a mutual transmission medium via each its own contact. The contacts belonging to a certain connection between a calling and a called subscriber are periodically closed during a short interval allotted to the connection in question. The information signals are thus fed over the mutual speech path in the form of modulated pulses. Each subscriber's circuit is provided with a low-pass filter, which only passes the modulation signal, but bars the harmonics and side-bands of the pulse frequency. A pulse frequency of the magnitude 8000 p./s. is generally chosen for the speech transmission, and the cut-off frequency of the filter is then made somewhat less than half the pulse frequency. In order to improve the efficiency of the energy transmission from one subscriber to the other, a delay line with a delay time substantially equal to half the pulse time is connected between the low-pass filter and the contact. The delay line of the sending subscriber is charged to approximately the amplitude of the signal during the time the contact is broken, and the energy thus stored is transferred into a well defined pulse with an amplitude distribution favourable from loss point of view during the pulse time to the delay line of the receiving subscriber during the time the contact is closed. The energy stored in the receiving subscriber's delay line is then discharged via the low-pass filter to the receiving subscriber's instrument.

At previously known transmission systems of this kind the low-pass filter components consist in a number of ordinary constant-$k$ links, at which the capacitance of the delay line is included in or wholly forms the terminating capacitance of the low-pass filter, which capacitance is turned towards the contact.

It is also known, for example from an article by K. W. Cattermole in Reprint R 2474 of the Institution of Electrical Engineers, London, p. 11, to use low-pass filter of Butterworth- or Tschebycheff-type for this purpose.

However, it has shown, that these filter types with a moderate number of elements do not meet the requirements demanded of an adequate connection. At lower frequencies within the pass band the attenuation is certainly small, but the attenuation increases considerably against the higher frequencies within the pass band. Moreover, the image frequencies, formed by the lower side-bands of the pulse frequency and lying comparatively near the cut-off frequency of the filter at higher signal frequencies, turned out not to be sufficiently attenuated but to cause disturbances.

With a filter according to the invention considerably lower attenuation of the higher frequencies within the pass band and a considerably better attenuation of the image frequencies are obtained compared with filters of a known type and with the same number of elements.

A low-pass filter for the terminal equipments in a pulse communication system of the kind where the information signals of the individual connections are transmitted from one signal place to another via a mutual transmission medium in the form of modulated pulses, whereby each signal place is connected to the mutual transmission medium via a terminal equipment comprising a periodically closing contact, a delay line or artificial line, the delay time of which is mainly equal to half the closing time of the contact, and a low-pass filter with a cut-off frequency below half the impulse frequency, characterized by the low-pass filter consisting of a substantially symmetrical $\pi$-link with a resonance frequency below half the pulse frequency nearest the delay line, the capacity of which at least partly forms one cross capacitance of the $\pi$-link, and a series branch turned towards the signal place and consisting of a parallel resonance circuit tuned to a frequency substantially equal to half the impulse frequency.

The invention will be further described in connection with the accompanying drawings, where—

Figure 2:
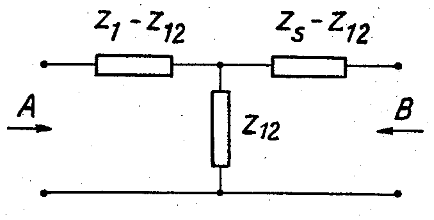
Figure 3:
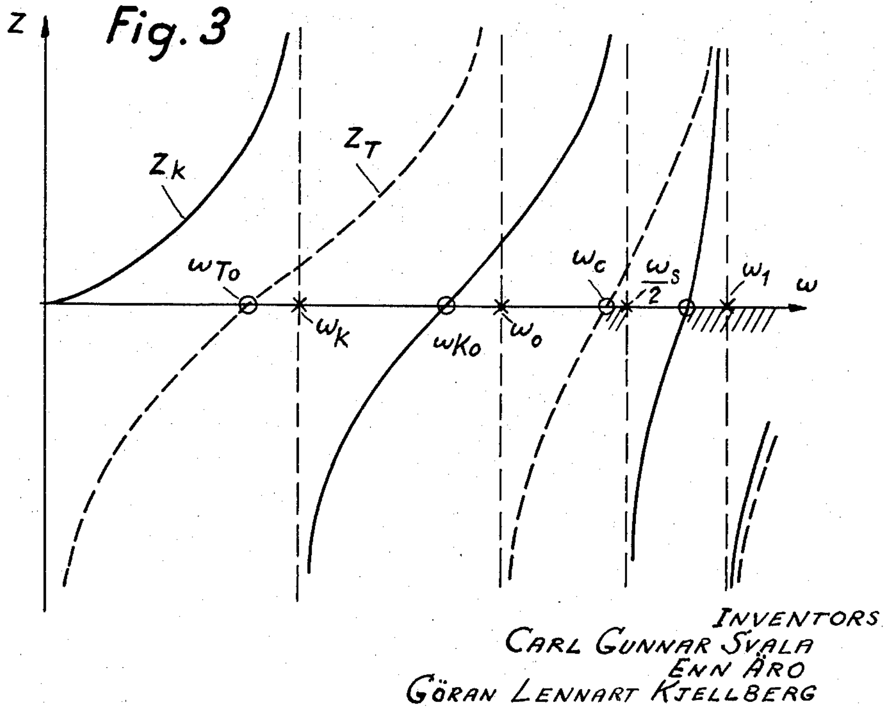
Figure 4:
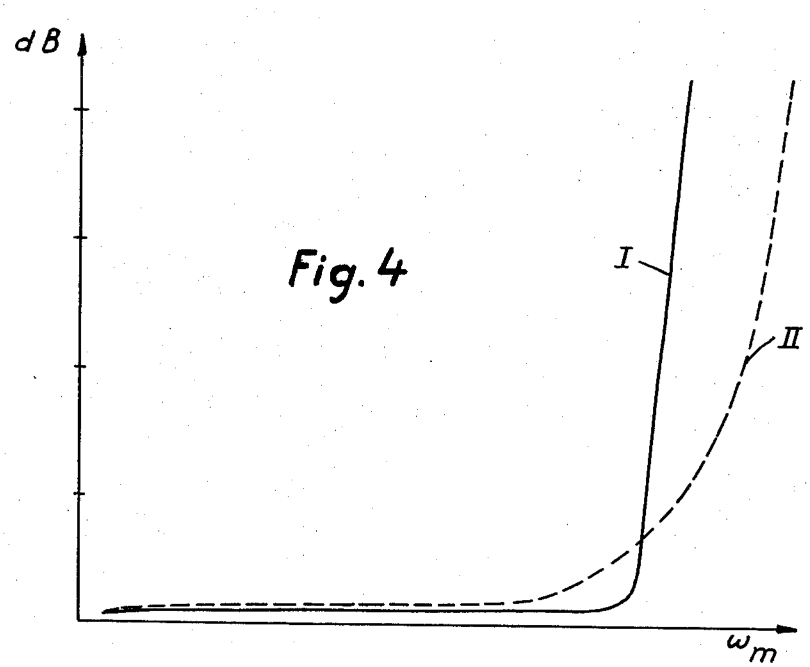
Figure 5:
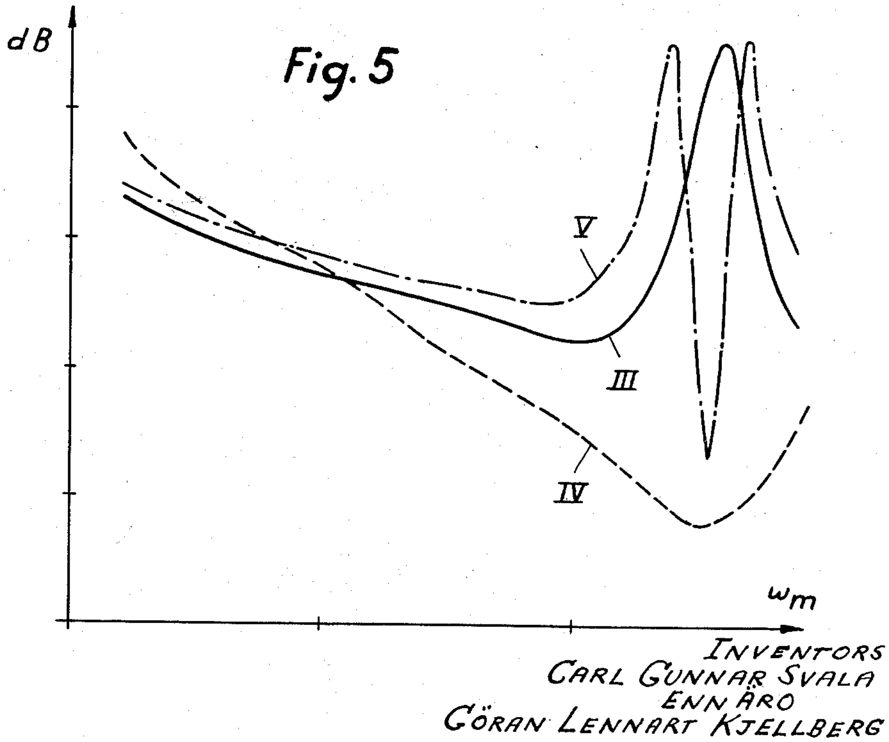

FIG. 1 shows a filter according to the invention,

FIG. 2 shows an equivalent circuit diagram used at the calculation of a filter according to the invention, FIG. 3 shows a diagram over the variation of an open circuit impedance and a short circuiting impedance with the frequency at a generic four-terminal network with the principal construction as shown in FIG. 1, FIG. 4 shows the operating attenuation of a filter according to the invention as a function of the modulation frequency compared with a known filter, FIG. 5 shows the image frequency attenuation of two filters according to the invention with somewhat different dimensioning, compared with a known filter.

FIG. 1 shows a low-pass filter according to the invention and used in connection with a delay line DL whose capacitance in the figure is indicated with the condenser $C_3$ of short dashes. The low-pass filter comprises a series branch turned towards the low-frequency side and consisting of an inductance $L_1$ and a capacitance $C_1$ connected in parallel therewith and, towards the pulse side, a $\pi$-link consisting of the series inductance $L_2$ and the cross capacitances $C_2$ and $C_3$, where the latter, as pointed out above, consists of the capacitance of the delay line. The low-pass filter and the delay line are connected between a signal source, for example a subscriber's instrument with the internal resistance R, and an impulse contact K. On the other side of the impulse contact K there is a further equipment of the same kind, which, however, is only schematically drawn as an impedance Z.

The impulse contact is periodically closed with a frequency $f_s$, which rises twice above the highest transmitted signal frequency, and each period the contact is closed during a time moment much shorter than the period, and that is pre-requisite for the following calculation of the dimensioning of the filter. Further, it is supposed that the components of the filter and the delay line are free from losses. The delay time of the delay line is substantially equal to half the time moment $\tau$ (pulse time), when the contact is closed. In order to simplify the calculations, the following is introduced $$C_2 = m$$

$$L_2 = \frac{1+m^2}{m\omega_0^2}$$

$$C_3 = \frac{1}{m}$$

where $\omega_0$ is the resonance angle frequency for the $\pi$-link formed by $C_2$, $C_3$ and $L_2$ $$\omega_0=\frac{1}{\sqrt{\frac{C_2\cdot C_3}{C_2+C_3}\cdot L_2}}$$

In order to calculate the filter we make an attempt to calculate the open circuit impedance $Z_T$ and the short circuiting impedance $Z_K$ seen from the low frequency side of the filter, i.e. the side turned towards the signal source, the impedance of the signal source and the impedance Z disregarded but with regard to the periodically closing contact K.

At calculation of the short circuiting impedance $Z_K$, it is started from the general T-network shown in FIG. 2. In a way known from the four-terminal network theory the longitudinal branch turned towards the low frequency side is here indicated $Z_1$–$Z_{12}$ and the cross branch $Z_{12}$. The longitudinal branch turned towards the pulse contact is in an equivalent way indicated $Z_s$–$Z_{12}$, where $Z_s$ is defined as the ratio between the average value of the potential at the terminals of the unloaded filter turned towards the pulse contact K during the pulse time and the low frequency current component of the pulse spectrum when the filter is fed with an infinite modulated impulse series with the modulation frequency $f_s$. It can now be proved, i.e. according to the above stated article by K. W. Cattermole, that if the normal open circuit impedance of the filter, seen from the terminals turned towards the pulse contact, is defined as $$z_2=\frac{P_{(p)}}{Q_{(p)}}$$

where $p=j\omega$ and $Q(p)=(p-p_1)\,(p-p_2)\,\ldots\,(p-p_{n-1})\,(p-p_n)$ the following relation for the impedance $Z_s$ is valid $$-z_s=\frac{1}{2f_s}\sum_{r=1}^{n}\frac{P(p_r)}{Q\cdot(p_r)}\coth\frac{1}{2f_s}(p_r-j\omega) \qquad (1)$$

The short circuiting impedance seen from A in the equivalent diagram according to FIG. 2 can now be calculated according to methods well-known from the four-terminal network theory and with use of the fictive impedance $Z_s$ defined in Equation 1

$$Z_K=Z_T-\frac{Z_{12}^2}{Z_s} \qquad (2)$$

at which, however, it is an important condition that the attenuation by the filter of all the components in the pulse spectrum, except the low frequency one, are so great that the currents of these components may be disregarded on the low frequency side of the filter. This requirement has turned out to be well met with by the pass band of the filter in question, and therefore this hypotheses is correct.

For the filter in question $Z_{12}$ is obtained by aid of known formulae $$Z_{12}=j\frac{m}{1+m^2}\,\frac{\omega_0^2}{\omega(\omega^2-\omega_0^2)} \qquad (3)$$

For the filter in question with five elements $L_1$, $L_2$, $C_1$, $C_2$, $C_3$ the following terms are obtained for $Z_s$ after certain transformations and simplifications from the Equation 1

$$Z_s=-\frac{j\pi}{\omega_s}\,\frac{m}{1+m^2}\left\{\cot\frac{\omega}{\omega_s}\pi\frac{m^2}{2}\left[\cot\frac{\omega+\omega_0}{\omega_s}+\cot\frac{\omega-\omega_0}{\omega_s}\pi\right]\right\} \qquad (4)$$

where $\omega_s=2\pi f_s$.

The open circuit impedance of the filter can easily be calculated from known formulae, since the contact K has no influence on this magnitude.

$$Z_T=j\frac{\omega L_1}{1-\omega^2L_1C_1}-\frac{1}{1+m^2}\,\frac{m}{\omega}+\frac{\omega}{m(\omega^2-\omega_0^2)} \qquad (5)$$

By insertion of the Equations 3, 4 and 5 in the Equation 2, $Z_K$ and $Z_T$ can now be calculated as a function of the modulation angle frequency $\omega$, the pulse angle frequency $\omega_s$, resonance angle frequency $\omega_0$ for the circuit $L_2$, $C_2$, $C_3$, the magnitude $m$ and $L_1$ and $C_1$. If a diagram is drawn over the impedances $Z_K$ and $Z_T$ as a function of the modulation angle frequency, it obtains the appearance shown in FIG. 3. From this diagram appears that at an arbitrary dimensioning of the components of the filter, several suppress bands appear (areas of short dashes) owing to the non-correspondence of the zero-places of $Z_K$ with the poles of $Z_T$ and conversely. However, at given values of $\omega_0$, $\omega_s$ or $m$ there is a certain range of possible values owing to the fact that $L_1$ or $C_1$ can be chosen arbitrarily provided that $L_1$ and $C_1$ are suitably correlated as to resonance. Evidently $L_1$ and $C_1$ can be chosen so that the first zero-place $\omega_{T0}$ of the open circuit impedance will coincide with the first pole of the short circuiting impedance at $\omega_k$, and in a corresponding way the first zero-place of the short circuiting impedance is brought to coincide with the pole of the open circuit impedance at $\omega_0$. Hereby it may be pointed out that $\omega_k$ is only determined by the presumed parameters $\omega_0$, $\omega_s$ and $m$, and this is obtained through putting the expression for $Z_s$ in Equation 4 equal to zero. If we, in order to simplify the calculations and the obtained expressions, normalize all the frequencies regarding the impulse frequency so that $f_s=1$, i.e. $\omega_s=f\pi$, the following expressions of the angle frequency $\omega_k$ for the first pole of the short circuiting impedance is obtained after reducing $$\omega_k=\arccos\frac{m^2+\cos\omega_0}{m^2+1} \qquad (6)$$

By putting the expression for the open circuit impedance $Z_T$ in Equation 5 equal to zero for $\omega=\omega_k$ (Equation 7), and by putting the expression for $Z_K$ in Equation 2 equal to zero for $\omega=\omega_0$ (Equation 8) the following equation system is obtained after reducing $$\frac{\omega_kL_1}{1-\omega_k^2L_1C_1}=\frac{m^2}{1+m^2}\,\frac{\omega_0-\omega_k^2\left(1+\frac{1}{m^2}\right)}{\omega_k(\omega_0^2-\omega_k^2)} \qquad (7)$$

$$\frac{\omega_0L_1}{1-\omega_0^2L_1C_1}=\frac{m}{1+m^2}\,\frac{1}{\omega_0}+\frac{\cot\frac{2}{\omega_0}+\frac{m^2}{2}\cot\omega_0+\frac{7m^2}{2\omega_0}}{2m^3(1+m^2)} \qquad (8)$$

From this equation system $L_1$ and $C_1$ can now be solved as a function of $m$, $\omega_k$ and $\omega_0$, and thereby also the frequency $$\omega_1=\frac{1}{\sqrt{L_1C_1}}$$

is defined, where as well $Z_T$ as $Z_K$ have poles. This frequency is obtained through placing the denominator in the first term in Equation 5 equal to zero, whereby both $Z_T$ and $Z_K$ obtain poles. A study of the impedance diagram in FIG. 3 shows that a limited suppress band followed by a second pass band immediately above $$\frac{\omega_s}{2}$$

appear between the cut-off frequency $\omega_c$, where $Z_T$ has its second zero place, and $$\frac{\omega_s}{2}$$

corresponding to half the pulse angle frequency. This latter pass band is, however, less desirable, as it causes too small an attenuation of the image frequency formed by the lower sideband of the pulse frequency in a frequency area around half the pulse frequency. However, within the frequency area in question, $\omega_s$ is a monotonous function of the presumed parameter $m$, and therefore it is easy to repeat the calculations according to Equations 6, 7 and 8 for systematically varying $m$-values, until $\omega_1$ is brought to coincide with or almost coincide with $$\frac{\omega_s}{2}$$

i.e. with $\pi$ at normalized frequencies according to the above. Thereby the second $$\left(\frac{\omega_s}{2}\right)$$

and the third ($\omega_1$) pole of $Z_K$ are brought to coincide, at which the harmful pass band between them is eliminated.

It has proved not necessary, or in certain cases not even suitable, to use the optimum dimensioning $$\omega_1=\frac{\omega_s}{2}$$

according to the above owing to that only the image frequency attenuation near half the pulse frequency has been taken into consideration at the above calculation. It has proved that the image frequency attenuation can be somewhat increased at lower frequencies, if $\omega_1$ is made somewhat greater than half the pulse frequency. At the same time the image impedance from the low frequency side of the filter $\sqrt{Z_T Z_K}$ becomes more constant over the bigger part of the pass band, which is reproduced in a higher-reflection attenuation. Since the image frequency attenuation near half the pulse angle frequency varies very much with $\omega_1$, $\omega_1$, however, ought under no circumstances to exceed $0.55\cdot\omega_s$. At $\omega_0\approx 0.4\omega_s$ this corresponds to $m\approx 1$.

In FIG. 4 operating curves are shown as a function of the modulation frequency $\omega$ for a filter according to the invention (continuous line I) compared with a filter with the same number of elements of Butterworth-type (line II of short dashes) at a pulse frequency $f_s$ of 8000 Hz. The symbol "Hz." is the internationally used symbol for cycles per second. From this diagram it appears clearly that a considerably sharper transition between pass band and suppress band is formed at the filter according to the invention with considerably lower bottom attenuation in the pass band and considerably higher blocking attenuation in the suppress band around the border frequency. The following data are valid for the filter according to the invention and shown in the diagram: $f_s$=8000 Hz., $f_1$=4000 Hz., $f_0$=3160 Hz., $m$=0.98.

In FIG. 5 curves for the image frequency attenuation at a pulse frequency of 8000 Hz. are shown as a function of the modulation frequency for the filter according to the invention, whose operation attenuation curve is shown in FIG. 4 (continuous line curve III) for a filter according to the invention with the same data except for $m$=1.0 and $f_1$=4300 Hz. (curve V of short dashes), and the Butterworth-filter, whose operation attenuation curve is shown in FIG. 4 (curve IV of short dashes). From these curves appears clearly that the image attenuation is very low for a filter of Butterworth-type near the cut-off frequency. For a filter according to the invention with the stated data and with $m$=0.98, the image attenuation has a peak at the cut-off frequency. By sacrificing this attenuation peak by dimensioning $m$=1 and $f_1$=4300 Hz. the image attenuation in the pass band may be somewhat increased without the transmission qualities noticeably changing. The attenuation minimum covers a very limited frequency area, and therefore the disturbance signal, that is passed, is concentrated to a narrow frequency band and has low energy.

Further, it may be pointed out that, in practice with regard to the limited speed of the contacting members, the pulse frequency is preferred to be placed as low as possible relatively the highest signal frequency. However, it has proved that if the $\pi$-link resonance angle frequency $\omega_0$, which varies mainly proportionally with the resulting cut-off frequency $\omega_c$, is placed considerably higher than $0.4\cdot\omega_s$, the image frequency attenuation, on the first hand, is impaired, at the same time as the reflection attenuation in the pass band becomes unsatisfactory.

As image adjustment for symmetrical reasons is obtained at the terminals turned towards the pulse contact, the image impedance on the low frequency side of the filter, which together with the phase shift is decisive for the reflection attenuation and the operation attenuation, has proved to be influenced of the quotient $$\frac{\omega_0}{\omega_s}$$

in a way reminding of the variation of the image impedance with the derivation parameter $m$ at $m$-derivated constant-$k$ filters. Thus, if the demand $\omega_1=\frac{1}{2}\omega_s$ is kept, the image impedance for $\omega_0<0.3\omega_s$ will monotonously decrease at increasing frequency, while it shows a more pronounced maximum at increasing values on $$\frac{\omega_0}{\omega_s}$$

A favourable compromise corresponding to a reflection attenuation >20 db is obtained at $\omega_0\approx 0.4\omega_s$.

The load impedance of the filter ought to be chosen approximately equal to the geometrical medium between the maximum values of the image impedances and the value at the frequency zero.

Finally, a practical example of the dimensioning of a filter according to the invention will be described.

Pulse frequency=8000 Hz.

Resonance frequency $f_0$ for the $\pi$-link $C_2$, $L_2$, $C_3$=3180 Hz.

The corresponding angle frequency normalized to the pulse frequency 1 is $$\frac{3180\cdot 2\pi}{8000}=2{,}4976 \text{ and } \frac{\omega_0}{\omega_s}\approx 0.4$$

By calculating according to the trial and error method with the Equations 6, 7 and 8, different values on $m$ are tried, until one is found for which the resonance frequency for the circuit $L_1$, $C_1$ coincides with half the pulse frequency. This happens when $m$=0.975. Inserted in the Equations 7 and 8 and according to the definiation of $m$, it gives the following values on the different components $L_1$=0.07203 h. $C_2$=0.9750 f.
$C_1$=1.4016 f. $C_3$=1.0256 f.
$L_2$=0.3207 h.

These values are valid for the pulse frequency $f_s$=1. From the term for the image impedance $Z_0$ on the low frequency side $Z_0=\sqrt{Z_T Z_K}$ the optimal charge impedance $R_{opt}$ on the low frequency side is calculated as the geometrical medium to $(Z_0)_{max}$ and $(Z_0)_{min}$. After determination of $(Z_0)_{max}$ and $(Z_0)_{min}$ $R_{opt}$=0.5553Ω is obtained, still under the presumption that $f_s$=1.

For reduction to normal charge impedances, for example 1000Ω, all the inductances should be multiplied with $$\frac{1000}{0.5553}$$

and all the capacitances divided with $$\frac{1000}{0.5553}$$

For reduction to an actual pulse frequency all the inductances and capacitances should be divided with this frequency, for example 8000 Hz. It gives $L_1=16.2$ mh. $C_2=0.0677$ $\mu$f.
$C_1=0.0972$ $\mu$f. $C_3=0.0712$ $\mu$f.
$L_2=74.5$ mh.

In the cases when the delay line is substituted with an approximate artificial line, which simply is formed of the condenser $C_3$ and an inductance connected between the filter and the pulse contact, for example according to FIG. 3 in British Patent No. 737,417, the calculation can be done in the same way and the same result is obtained.

We claim:

1. A terminal circuit system for a pulse communication system of the kind in which intelligence signals are transmitted in the form of modulated pulses from one station to another by means of a common transmission medium, each station being connected to the common transmission medium through a terminal circuit system, said terminal circuit system comprising a periodically closing switch contact means for connecting each station to said transmission medium, a delay line having a delay time substantially equal to half the closing time of said switch contact means, and a low pass filter network having a cutoff frequency of less than half the frequency of said pulses, the switch contact means, the delay line and the filter network being connected in series, said filter network including a linking network connected to said delay line and formed by a series inductance and a capacitance means, the latter being shunted across said delay line by shunt branches on each side of said series inductance, said linking network having a resonance frequency of less than half the pulse frequency, the capacitance of one of said shunt branches being formed at least partly by the capacitance of the delay line, and said filter network further including a series branch connected between the delay line and the respective station and including a resonance network formed by an inductance and a capacitance connected in parallel, said series branch having a resonance frequency equal to half the pulse frequency.

2. A terminal circuit system according to claim 1 wherein the series branch of the low pass filter network has a resonance frequency 0.50 to 0.55 times the pulse frequency.

References Cited in the file of this patent

UNITED STATES PATENTS

| | | |
|---|---|---|
| 2,465,407 | Varela | Mar. 29, 1949 |
| 2,691,727 | Lair | Oct. 12, 1954 |
| 2,718,621 | Haard et al. | Sept. 20, 1955 |

FOREIGN PATENTS

| | | |
|---|---|---|
| 218,043 | Australia | Nov. 28, 1957 |